Feb. 14, 1961　　W. J. JAKIMIUK　　2,971,725
AIRCRAFT TAKE-OFF AND LANDING APPARATUS
Filed Dec. 20, 1955　　5 Sheets-Sheet 1
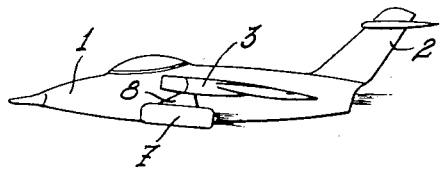
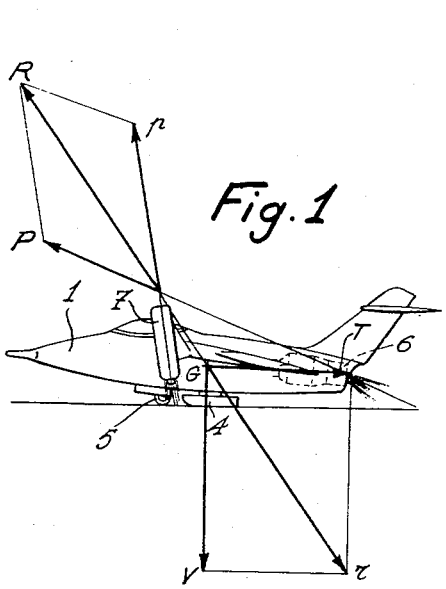
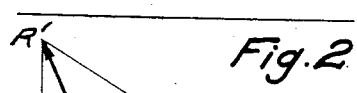
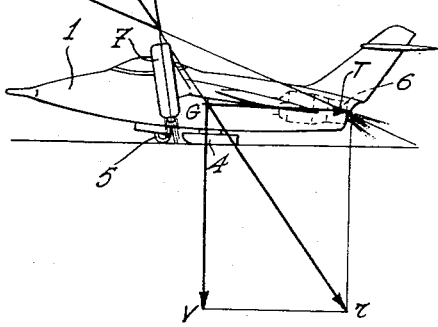
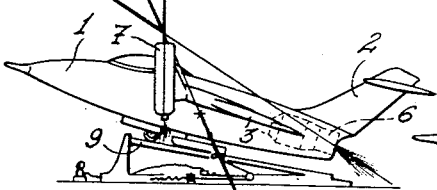
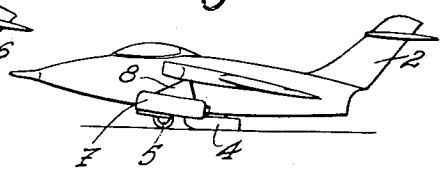
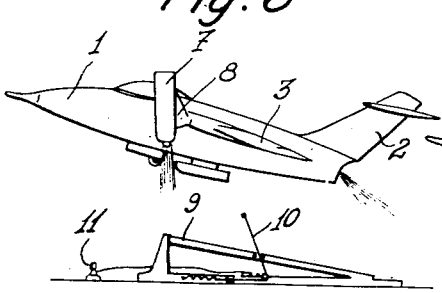

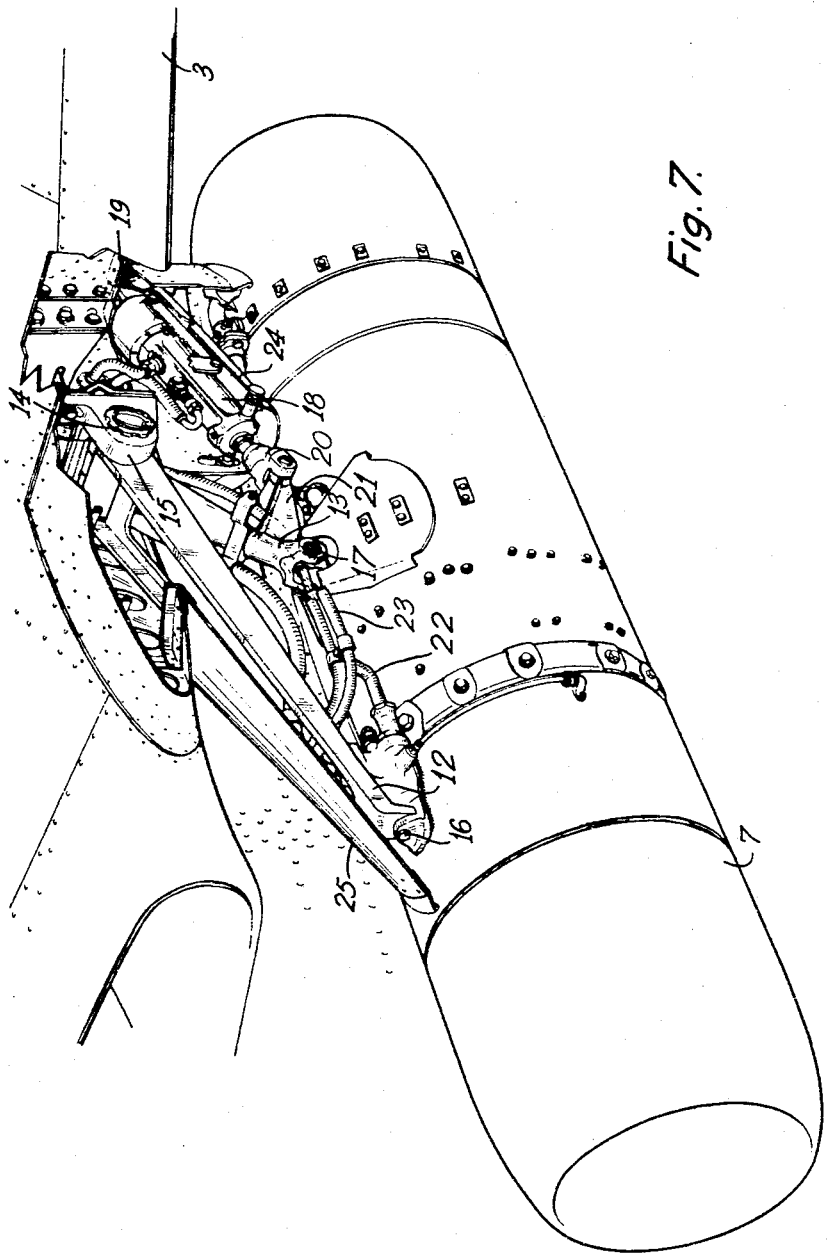

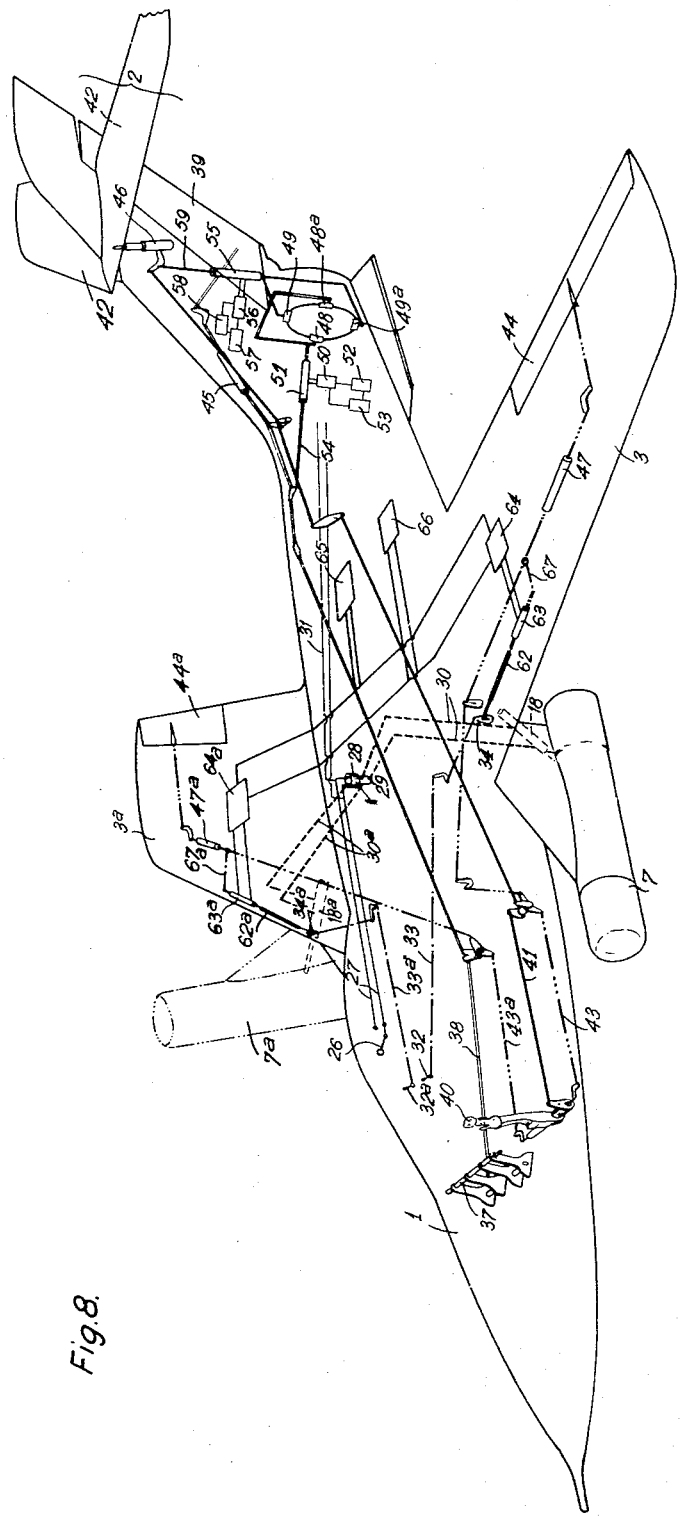
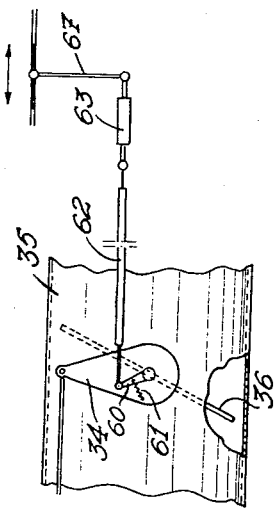
Fig. 8.
Fig. 9

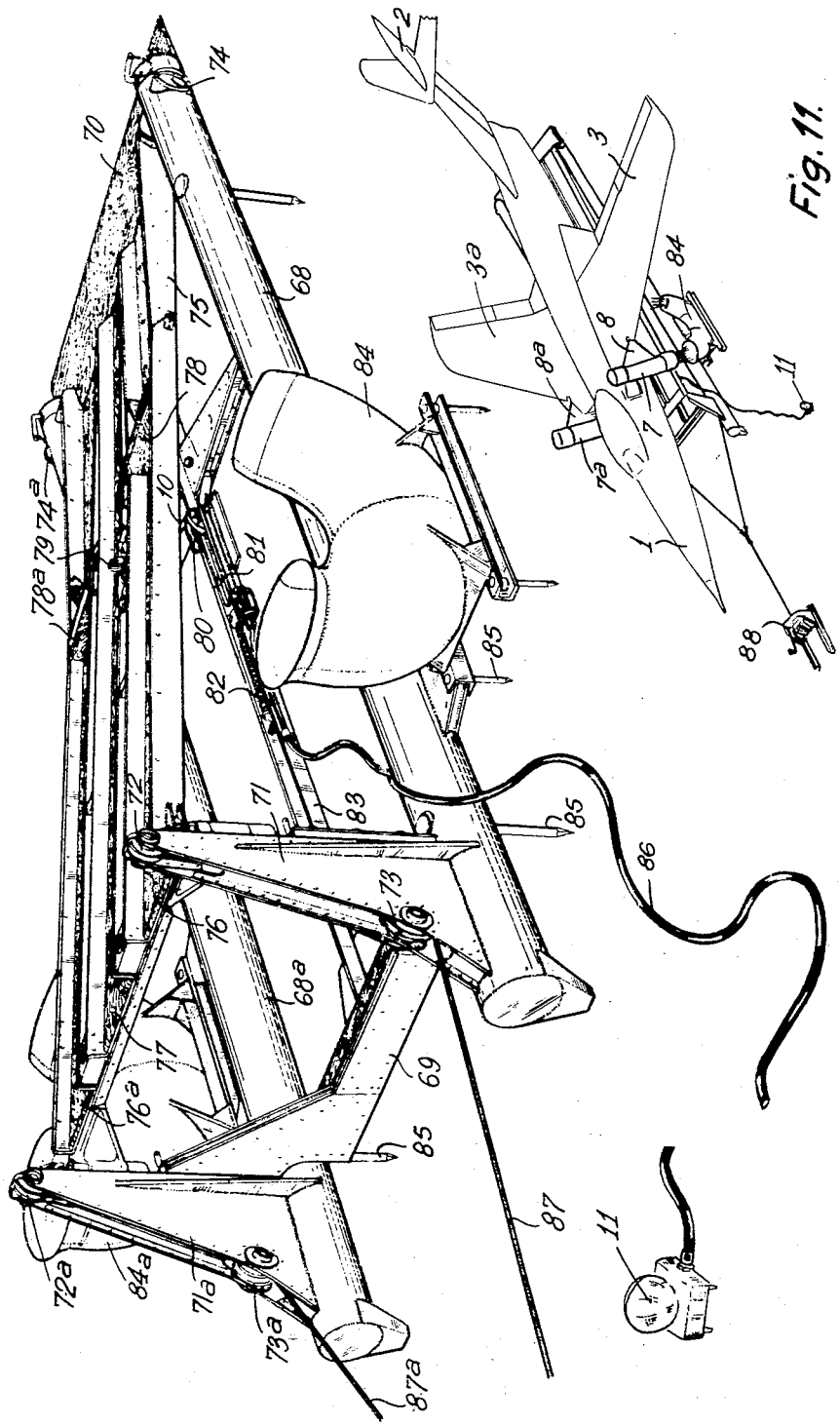

United States Patent Office 2,971,725
Patented Feb. 14, 1961

2,971,725

AIRCRAFT TAKE-OFF AND LANDING APPARATUS

Wsiewolod John Jakimiuk, Paris, France, assignor to Sud-Est Aviation Societe Nationale de Constructions Aeronautiques, Paris, France Filed Dec. 20, 1955, Ser. No. 554,303

Claims priority, application France Dec. 31, 1954

7 Claims. (Cl. 244—63)

The present invention is concerned with aircraft take-off and landing problems.

One of the most important problems for which a satisfactory solution is sought in present days in aeronautics is the reduction of aircraft take-off and landing runs in view of freeing aviation from limitations and obligations arising from the construction of take-off runways and landing stages, as these are not only extremely costly but particularly vulnerable in case of war, and it is evident that if they are destroyed or seriously damaged it becomes very difficult if not impossible for a country to make reprisals after an attack by the enemy. To this end it has been suggested to fit landing-skids on aircrafts, and on the other hand various propositions have been made in connection with different launching devices to assist the take-off of aircrafts.

In this specific field the applicant has brought definite improvements in conventional landing-gears by combining a pair of rear landing-skids with a front or nose wheel so as to permit a take-off without using a launching carriage. The aircraft thus equipped has all the advantages of aircraft equipped with landing-skids and is self-steering on the ground. However, the take-off runs are still relatively long.

Besides, except for helicopters or more generally rotor-aircraft adapted to take-off from their position of rest, vertical take-offs have recently been effected with fixed-wing aircraft. In this case the aircraft is set upright on its tail, takes off in this position and is rotated to its normal flying position when a sufficient sustentation speed is attained.

In the application of this method to a jet-propelled aircraft the main difficulty lies in the stabilization of the aircraft during the take-off, and various hitherto unsolved problems arise in connection with the rotation from take-off to flying position.

In order to avoid these drawbacks and reduce the take-off and landing runs, it is the essential object of this invention to provide a novel method of effecting the take-off and landing of a fixed-wing jet-propelled aircraft, characterized in that by properly deflecting the reaction-jets produced by its propulsion engines and adjusting the power output thereof, a thrust resultant is applied from the very beginning of the take-off period landing-gear, this thrust resultant passing through the center of gravity of the aircraft, being substantially parallel to its take-off direction and having a vertical component of a value sufficient to overcome the action of gravity and to cause the aircraft to take-off from the ground, after a short run, in a direction approximating said take-off direction, the jet deflection or change of direction being also used when landing for either easing the aircraft of which the tail engages the ground first, or reducing the landing run by reducing the speed to the limit of control-surface manoeuvrability.

According to one form of embodiment of the method broadly set forth hereinabove, the vertical thrust component is the resultant of three vertical lift forces applied to the aircraft according to a triangle disposed around its center of gravity. Thus, a logical and safe sustentation system is obtained which corresponds to the sustentation of a three-legged table.

According to another form of embodiment of the take-off method broadly disclosed hereinabove, the aircraft is set at a moderate inclination, for example 15 to 20 degrees, to permit its take-off without rolling or sliding on the ground by running up the engines and increasing the vertical component produced by the deflection of the reaction jets issuing from these engines, provided that the aircraft weight is consistent with the aforesaid vertical component.

The method of this invention makes it possible on the one hand to take off after very short runs and without using any take-off or launching device, and, on the other hand, by using special devices to be described presently, to enable an aircraft to take-off by means of its own powerplant without rolling or sliding beforehand, the aircraft attaining its normal flying speed without having to rotate, i.e. by simply straightening the jets of its engines.

It is another object of the present invention to provide a fixed-wing jet-propelled aircraft for carrying out the method set forth hereinabove, this aircraft comprising means for deflecting, and adjusting the power output of the jets produced by its jet-engines to permit the sustentation and stabilization of the aircraft both in take-off and landing conditions and also for propelling the aircraft during the take-off and in normal flight.

According to an advantageous form of embodiment the aircraft has a monoplane wing structure associated with three jet engines, mounted the one in the rear or tail portion of the aircraft fuselage, and the other two on either side of the fuselage under the wings, these jet engines being associated with adjustable means adapted to control the direction and power output of the jets of these engines and controlled in turn from a combined automatic and manual pilot unit as long as the velocity of motion of the aircraft is lower than the limit-speed at which conventional control-surfaces can be operated. The automatic pilot unit may advantageously consist of three stabilizing servo-mechanisms inserted in the circuits of the elevator-, rudder- and warping controls, respectively.

The two lateral jet engines are supported under the wings by mounts adapted to pivot about horizontal axes at right angles to the plane of symmetry of the aircraft, whereby the engine jets can be set to the desired inclination by simply rotating the jet engines to the proper, predetermined angle. Preferably these pivoting mounts are adapted to maintain the lateral jet engines either in a substantially horizontal position, i.e. parallel to the line of flight of the aircraft as in fixed, conventional power units, or in a substantially vertical position after rotating the engines to a position in front of the leading edge of the wing, the jets being directed downwards in this case, this other position being used when taking off and landing.

The aforesaid lateral jet engines may also be placed in any intermediate position so as to permit an adequate setting of the vertical component according to the take-off load conditions and to the piloting conditions, and on the other hand their actions may be differential. Moreover, these lateral jet engines may be acted upon by altering their power output for stabilization purposes; in this case, the servo-mechanism inserted in the warping control circuit may be operatively connected to the throttle controls of these jet engines.

The central jet engine mounted in the tail portion of the fuselage is provided with a known device adapted to deflect the jet downwards to a substantial extent, this device being actuated when taking off to increase the lift or vertical thrust and contribute in stabilizing the aircraft in combination with the vertical thrusts of the lateral jet engines rotated to their substantially vertical position. Then the stabilizing action is completed by elevator-control spoilers and rudder-control spoilers disposed in the ejection pipe of the tail jet engine, these spoilers being controlled by the servo-mechanisms inserted in the circuits of the elevator- and rudder-controls, respectively. With the aircraft according to the present invention it is possible for the pilot to take off, by rotating the lateral jet engines to a substantially vertical position and actuating the system for deflecting the jet produced by the tail jet engine, after a relatively short run. It is also possible, according to the load carried by the aircraft, the power output of the jet engines and the maximum possible downward inclination of the central and lateral jet engines, to take off from running-up conditions, i.e. without rolling or sliding on the ground, by using a take-off platform having roughly the form on an inclined plane the angular setting of which is adjustable to obtain an angle value adapted to increase the vertical thrust component of the rear or central jet engine.

The landing may take place at very low speed, to the limit of manoeuvrability of the aircraft surface controls, due to the possibility of utilizing the lift produced by the inclination of the front and of the rear jet engines. According to the load involved, the landing may be effected at a speed below the limit of manoeuvrability by using the automatic pilot and manual control producing a directional deflection of the jets and an adequate variation in the power output of the engines, by causing the aircraft to engage the ground firstly with the tail, and then allowing it to "drop" by pivoting about its tail, this "dropping" being retarded by the action of the front jet engines. The thrust resultant at landing has a value less than that of the thrust resultant at take-off.

Other features and advantages of the present invention will appear as the following description proceeds with reference to the accompanying drawings forming part of this specification and illustrating diagrammatically by way of example one manner in which the invention may be carried out in the practice. In the drawings:

Figure 1 illustrates in side view an aircraft constructed in accordance with the teachings of this invention, as it rolls on the ground before taking off, with the diagram of the various forces acting on the aircraft.

Figure 2 is a similar view showing the aircraft in normal flying position, after the take-off.

Figure 3 is a similar view showing an aircraft on the ground before it takes off under running-up conditions from a take-off platform.

Figure 4 is another side view showing the same aircraft mounted on the take-off platform, with the diagram of the various forces acting on the aircraft.

Figure 5 shows the position of the aircraft as it leaves the take-off platform but is still connected thereto through a guide-rope the purpose of which will be described presently.

Figure 6 is another side view showing the aircraft of Figures 3 and 4 after the take-off.

Figure 7 is a perspective view showing a lateral jet engine mounted under the wing, together with the members and mechanisms for supporting and rotating same.

Figure 8 is a diagrammatical view showing the manual and automatic control system of the aircraft according to the present invention, one of the lateral jet engine being in its normal flying position and the other in its take-off position.

Figure 9 is a detail view showing on a larger scale the throttle control of one of the lateral jet engines.

Figure 10 is a perspective view showing the take-off platform according to this invention.

Figure 11 is a perspective view showing on a smaller scale the aircraft mounted on the take-off platform.

Figure 12:
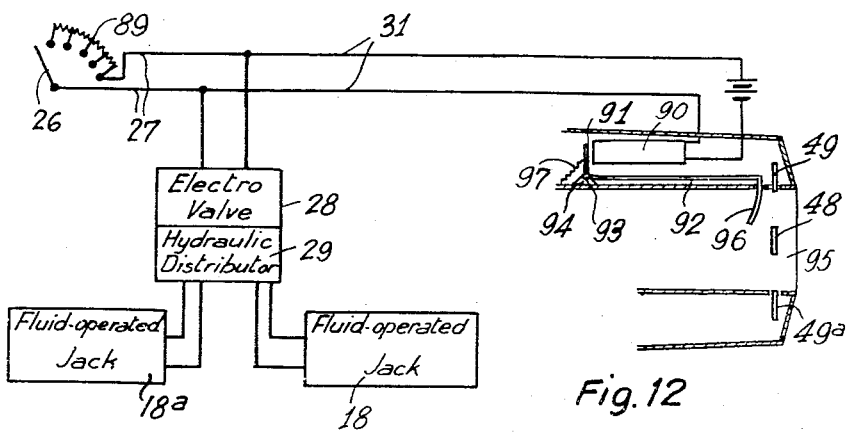
Figure 12 is a diagrammatic view of the device for deflecting downwards the jet from the central jet engine and of its control.

The aircraft, as will be clearly seen from the Figures 1 to 5, 8 and 11, comprises a fuselage 1, conventional tail-unit 2, a pair of monoplane wings 3, 3a and a landing undercarriage comprising essentially a pair of rear skids 4, 4a and a single front wheel 5. This aircraft is equipped with a central jet engine 6 located in the rear portion of the fuselage 1 and two lateral jet engines 7, 7a mounted under the wings, 3, 3a respectively in adequate mounts 8, 8a adapted to be rotated so that the lateral jets may be set either in the substantially horizontal position illustrated in Figs. 2 and 3 (normal flying and parking position) or in the substantially vertical position illustrated in Figs. 1 and 4 to 6 (take-off and landing position). The central jet engine 6 is equipped with a known device for deflecting its reaction jet downwards.

When it is desired to take off from the ground as illustrated in Fig. 1, the lateral jet engines 7, 7a are rotated to a substantially vertical position in front of the leading edge of the wings, and at the same time the device for deflecting downwards the jet from the central jet engine 6 is actuated. The thrusts P and p exerted by the central jet engine 6 and lateral jet engines 7, 7a give a resultant force R passing through the center of gravity G and counteracting the resultant force r constituted by the aircraft weight V and by a force T which is the sum of the inertia, frictional and drag forces. The vertical component of said resultant R is the resultant of the three vertical lifting forces defined by the vertical components of thrusts P and p which are applied to the aircraft at the apices of a triangle through which passes the vertical line drawn from the center of gravity G. As the aircraft moves on the ground the thrust resultant R and the load and drag resultant r tend to assume equal values, and when these values are actually equal the aircraft rises from the ground in a direction parallel to the resultant R. As the aircraft picks up speed, the pilot reduces the inclination of the lateral jet engines 7, 7a and that of the jet issuing from the rear central jet engine 6 to bring these lateral jet engines back to their normal flying position shown in Fig. 2 and enable the direction of normal flight.

In the case illustrated in Fig. 1 the aircraft will take off after a run reduced to a very short distance. However, and as already stated, it is also within the scope of this invention to enable an aircraft to take off from running-up conditions, as will be explained hereafter with reference to Figs. 3 to 6 of the drawings. In this case the aircraft is movable on the ground by having its lateral jet engines 7, 7a and its rear main central jet engine 6 set in normal flying conditions, as shown in Fig. 3. Then the aircraft, under the aforesaid self-propelling conditions, will get up on the floor 9 of a take-off platform set in a low position, and this floor is subsequently raised through any suitable and known means to the steeper position illustrated in Fig. 4 with a view to increase the vertical thrust component of the rear jet engine, thereby producing a thrust resultant R' opposing the weight and drag resultant r' of the aircraft.

Under the impulse of this resultant force R' the aircraft rises in the air above the platform and its position with respect thereto is controlled by means of a releasable cable 10 connected to the aircraft and adapted to produce a light signal by causing a tell-tale lamp 11 to light up when the rising aircraft reaches a predetermined distance above the inclined floor 9. It may be noted that the cable 10 takes a direction parallel to the aforesaid resultant R'.

After a short running-up period for ascertaining the stability of the aircraft the pilot releases the cable; the aircraft will then rise in a direction parallel to this resultant R' as it picks up speed, and finally the pilot controls the jet engine setting controls to bring the aircraft in the normal flying position shown in Fig. 2.

Figure 7 shows the details of an embodiment of the mounting of a lateral jet engine 7 or 7a. The engine is supported by a pair of arms 12, 13 pivotally attached to a common transverse shaft 14 carried by a yoke 15 secured on the wing structure 3 (or 3a); moreover, these arms are pivotally attached also to the jet engine at 16 and 17, respectively, through pivot pins 16, 17 disposed at right angles to each other. Besides, a jack 18 the body of which is pivoted at 19 on the wing structure has its piston-rod hingedly connected through another yoke 20 to an arm 21 rigid with the arm 13 and directed to the rear of this arm 13, as shown. In its expanded condition the jack 18 is adapted to tilt the jet engine by rotating the arms 12, 13 about the shaft 14 to move the engine from the position shown in Fig. 3 to the position shown in Fig. 1 or 4. The pipes 22, 23 are part of the fuel system of the jet engine and comprise flexible sections to accommodate the rotation of said engine.

The jack 18 is enclosed in a casing 24 and the complete jet engine mount and control elements are covered by a fairing 25.

Figure 8 shows diagrammatically the complete arrangement of the control system of the three-engined jet-aircraft just described for controlling the latter under normal flying conditions and stabilizing it during the take-off and landing.

To control simultaneously the rotation of the lateral jet engines 7, 7a and the operation of the jet-deflection system of the central jet engine 6 the pilot actuates a lever 26 controlling through an electric circuit 27 an electromagnetic valve 28 operatively connected to a hydraulic valve 29 controlling in turn through two pairs of pipes 30, 30a (shown in broken lines in the figure) the jacks 18, 18a respectively, these jacks being adapted to rotate the lateral jet engines 7, 7a, respectively. On the other hand, the circuit 27 has connected thereto a branch circuit 31 interrupted in Fig. 8 for the sake of clarity. Said circuit 31 (Fig. 12) controls the energization of an electromagnet 90 adapted to attract a blade 91 carried by a lever 92 hingedly mounted at 93 on a support member 94 secured on the outer surface of the jet-nozzle 95 equipping the central jet engine 6. At its other end said lever 92 carries a spoiler 96 which, when electro-magnet 90 is energized, partially obturates said jet-nozzle 95 and deflects downwards, in a well known manner, the jet of said central engine 6. A spring 97 takes said spoiler out of said jet-nozzle 95 when the pilot switches off the electric circuit 27 in order to direct the jet of said central engine 6 to its normal flying direction.

The electromagnetic valve 28 and the hydraulic valve 29 are so constructed that upon actuation of the control lever 26 the lateral jet engines 7, 7a may be rotated to any desired angular position between the substantially horizontal position in which they are set for normal flight and the substantially vertical position in front of the leading edge of the wings 3, 3a, either simultaneously or differentially to make due allowance for the jet engine load and power conditions, as the position of the central engine jet-deflecting device is subordinate to the position of the tipped lateral jet engines 7, 7a. In the embodiment shown in Fig. 12, the adjustment of said rotation is obtained by means of a rheostat 89. The pilot may actuate as required a pair of control levers 32, 32a for regulating the power output of these jet engines, these control levers being operatively connected through control lines 33 and 33a illustrated in dot-and-dash lines to levers 34, 34a mounted externally of the jet engine fuel supply pipes 35 and rigidly connected to throttle valves 36 mounted within these pipes (see Fig. 9).

The rudder control (shown in double lines in the figure) is of the conventional type and comprises rudder pedals 37 connected through rods 38 and bell-crank levers to the rudder 39. The vertical control (shown in thick unbroken lines) is also of the conventional type including a control stick 40 acting through linkage rods 41 on the elevator or horizontal rudder 42. The warping control (shown in dash-and-dot lines with three dots per dash) is actuated by means of the stick 40 connected through rods 43, 43a to the ailerons 44 and 44a. Servo-control mechanisms such as mechanically or electrically-actuated jacks 45, 46, 47 and 47a are inserted in the control rods 38, 41, 43 and 43a respectively.

Figure 13:
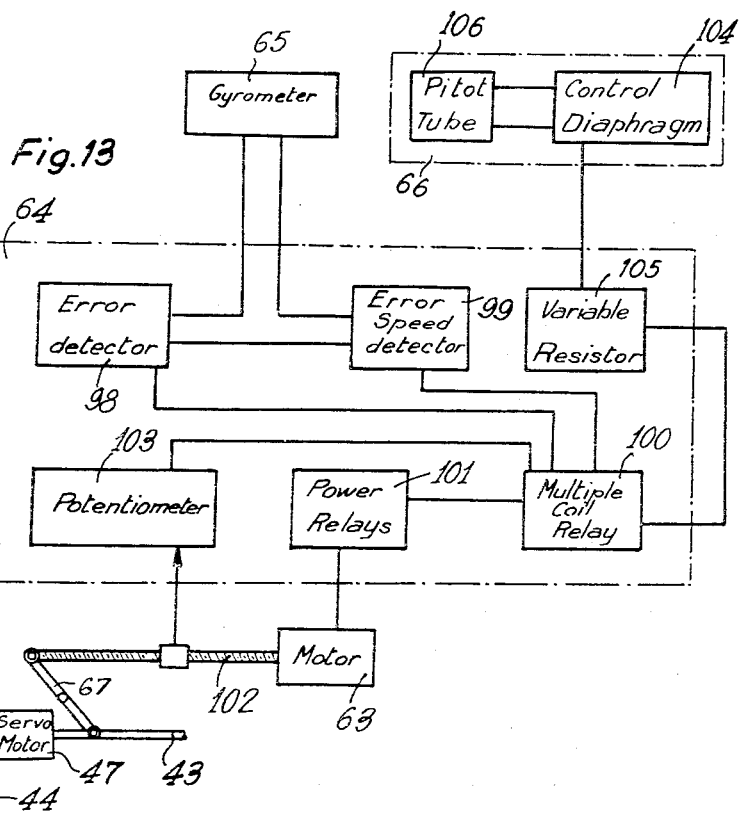
Figure 13 is a diagrammatic view of the stabilizing servo-mechanism associated with the warping control.

During the take-off the stabilization setting provided by the pilot must be corrected to increase safety conditions and to this end each main control is associated with a stabilizing servo-mechanism of the type illustrated in Fig. 13 for the warping control. Thus, a gyrometer such as the rolling gyrometer 65 detects the error and the angular speed of the error for each of the three axes and converts it through detectors 98 and 99 into a signal fed to a comparator consisting of a multi-coil sensitive biased relay 100. This sensitive relay 100 controls power relays 101 actuating a motor unit such as the jack 63 interposed in the gear of the relevant control ailerons 44 and 44a and comprising an electromotor having an armature adapted to receive in one or the other direction the current transmitted from the power relay 101. A screw-and-nut device 102 is provided for altering the center-to-center distance of the ram and therefore the length of the corresponding control rod. A potentiometer 103 associated with this jack transmits the changes in the aforesaid center-to-center distance to one of the sensitive-relay windings, thereby providing the servo-action positioning. On the other hand, the control signal is subordinate to the aircraft speed through a variable resistor 104 connected to one of the sensitive relay coils and controlled in turn by an anemometer diaphragm 105 adjusted through a Pitot device 106.

To simplify both the disclosure and the drawing the biased sensitive relay, power relays, servo-action potentiometer and variable resistor will be referred to hereafter under the more generic term of "amplifier," and the Pitot device with the anemometer diaphragm associated therewith will be denoted by the general term of "Pitot pressure device."

The exhaust pipe of the central jet engine is equipped with four stabilization spoilers, i.e. two direction or yaw spoilers 48, 48a and two vertical or pitching spoilers 49, 49a (Fig. 8). The direction spoilers 48, 48a are controlled from an electrically-actuated jack 51 connected to an amplifier 50 receiving signals from the yaw gyrometer 52 and the Pitot pressure device 53 respectively similar to the devices 63, 64, 65 and 66 illustrated in Fig. 13. This jack 51 is also connected through a rod 54 to the rudder control rod 38.

The vertical spoilers 49, 49a are controlled from an electrically-operated jack 55 connected to an amplifier 56 receiving signals from the pitching gyrometer 57 and the Pitot pressure device 58 also respectively similar to the devices 63, 64, 65 and 66 illustrated in Fig. 13. This jack 55 is further connected through a rod 59 to the elevator-control rod 41.

The warping stabilisation is obtained by connecting the levers 34 or 34a (Fig. 9) through springs 61 to levers 60 mounted on the same pivot pins as the levers 34, 34a and rigidly connected to the throttle valves 36. These levers 60 are also connected through Bowden control wires 62, 62a to electrically-operated jacks 63, 63a connected in turn to amplifiers 64, 64a. These amplifiers 64, 64a are supplied with control signals from the rolling gyrometer 65 and the Pitot pressure device 66. The jacks 63, 63a are also connected through screw-and-nut devices 102 and rods 67, 67a to the aileron control rods 43, 43a (Figs. 8 and 13).

With the control arrangement described hereinabove a combined automatic and manual control or pilotage action can be obtained by modifying the setting of the jet engines when the velocity of the aircraft is lower than the limit speed or manoeuvrability limit at which conventional controls are still effective, i.e. during the take-off and landing periods, due to the fact that the automatic control actions produced by the servo-mechanisms are conjugated with the usual flying controls and call for the same reflexes. However the thrust resultant at landing has a value less than that of the thrust resultant at take-off.

If it is desired to take-off from running-up conditions, i.e. without any rolling or sliding of the aircraft on the ground, the device illustrated in Fig. 10 may be used. This device comprises a frame structure consisting of a pair of tubular longitudinal side members 68, 68a, a front cross member 69, a rear cross member 70 and a pair of yoke-shaped uprights 71, 71a. Each upright has mounted therein a pair of grooved pulleys 72, 72a and 73, 73a.

The longitudinal side members 68, 68a carry at their rear ends a pair of pivot pins 74, 74a for hingedly mounting a floor structure 75. This floor structure 75 comprises a pair of lateral guide paths 76, 76a spaced and adapted to be engaged by the aircraft skids 4 and a central guideway 77 in which the front central wheel 5 of the aircraft is adapted to run. This floor structure is also equipped with removable chocks 78, 78a to be used for holding the lateral skids 4 against motion. Projecting from the upper surface of the floor is a hook or like coupling member 79 anchored to one end of a guide-rope 10 passing over a grooved pulley 80 rotatably mounted on a slide-block 81 associated with a safety spring 82 for controlling the movement of the guide-rope, this assembly being mounted on a central longitudinal member 83 of the frame structure.

In addition, a pair of relatively large elbow pipes or return bends 84, 84a are mounted on either side of the frame structure, as shown, for recovering the exhaust jets from the lateral jet engines and directing them against the lower surface of the aircraft wings. An adequate number of spikes 85 are provided for anchoring the frame structure to the ground. A tell-tale lamp 11 is placed on the ground in front of and somewhat laterally to the take-off platform; this lamp is connected through an electric cable 86 to the electric circuit of the aircraft about to take off. Finally, a pair of cables 87, 87a passing over the grooved pulleys 72, 72a and 73, 73a have one end secured to the floor structure 75 and their other ends attached jointly to a common cable adapted to be wound on the drum of a winch 88 which may be of any desired or suitable type (see Fig. 11).

The take-off of an aircraft from running-up conditions occurs as follows: Firstly, the floor structure 75 is lowered and the aircraft moved thereon under self-propelling conditions, the front wheel 5 engaging the central guideway 77 and the skids 4 the guide-paths 76, 76a. Then the chocks 78, 78a are set in position and at the same time the connections between the coupling member 79 and the aircraft, on the one hand, and between the cable 86 and the electric circuit of the aircraft, on the other hand, are made. Finally, the floor structure 75 is pivoted about the pins 74, 74a to a position in which it forms a greater angle with the ground, by actuating the winch 88 to wind the cables 87, 87a, the inclination of the platform being consistent with the load of the aircraft and the power rating of its jet engines. Then the pilot may control the rotation of the mounts 8, 8a supporting the lateral jet engines 7, 7a to bring the latter to a substantially vertical position, and at the same time he adjusts the rear-engine jet deflecting spoilers to the proper setting. Thus the assembly is positioned substantially as shown in Figs. 4 and 11.

During the initial period of the take-off without sliding the automatic pilot will operate to correct the direction of the exhaust jets and alter the power outputs of the jet engines as required. The pilot controls the aircraft through the stick and pedals as usual, and his action may be substituted for that of the automatic pilot during the same initial period, so that it is possible to pass from take-off to normal-flying conditions without any intermediate stage, i.e. very smoothly.

The jets from the lateral jet engines 7, 7a are directed by the return-bend pipes 84, 84a against the lower surface of the wings 3, 3a to provide an additional thrust component. The aircraft tends to rise above the platform. Its position with respect to this platform may be controlled through the releasable rope 10 secured through the coupling member 79 to the aircraft and adapted to light through suitable contact members the tell-tale lamp 11 visible by the pilot when the aircraft has risen a predetermined distance above the take-off platform (Fig. 5). The engines are run up during a short period in this position to enable the pilot to finish the aircraft stability by properly setting the jet engines. Then the pilot releases the coupling member 79 and the aircraft rises obliquely (Fig. 6). As it picks up speed the controls become more and more responsive and the front jet engines 7, 7a are progressively inclined to finally restore the latter to their normal flying positions under the wings. At the same time the jet from the central rear engine is straightened so as to direct it in the normal flying direction.

Of course, many modifications and alterations may be brought to the device described hereinabove and shown in the diagrammatical attached drawings, without departing from the scope of the invention as set forth in the appended claims.

Although the invention has been described and illustrated with reference to an aircraft equipped with an undercarriage consisting of lateral skids and a front wheel, it will be readily understood by anybody conversant with the art that it is also applicable to other types of fixed-wing aircraft, notably aircraft equipped with landing wheels.

What I claim is:

1. A fixed-wing jet-propelled aircraft comprising a fuselage, a conventional monoplane wing structure secured on said fuselage and having conventional ailerons, a conventional tail-unit having an elevator and a rudder, three jet engines mounted the central one in the tail portion of the fuselage and the other two lateral on either side of said fuselage under the wing structure, a first set of adjustable devices for varying the direction of the jets of said engines, a second set of adjustable devices for varying the power output of said lateral jet engines with deflected jets, whereby under the action of said two sets of adjustable devices the take-off and the landing of said aircraft may be obtained after a short run by applying to said aircraft a thrust resultant substantially parallel to the take-off direction thereof which passes through its center of gravity and has a value sufficient to relieve its weight, and a combined automatic and manual pilot unit adapted to simultaneously correct the adjustment of the adjustable device for varying the direction of the jet of the central jet engine, of the adjustable device for varying the power output of the two lateral jet engines and of the stabilization setting of the control-surfaces provided by the pilot for a relative speed of the aircraft lower than the limit speed of conventional control-surfaces maneuversability.

2. An aircraft, according to claim 1, wherein the adjustable device for varying the direction of the jet of the central jet engine comprises a conventional device for imparting a substantial amount of downward deflection to said jet.

3. An aircraft, according to claim 1, comprising two adjustable supplemental devices for respectively varying the direction of the jet of the central jet engine in the directions of the pitch and of the yaw, respectively, and wherein the combined automatic and manual pilot unit comprises conventional rudder-, elevator-, and warping controls, three gyrometers subordinate to the aircraft speed and respectively responsive to variations around the yaw-, pitching- and rolling-axes, and three stabilizing servo-mechanisms respectively inserted in said rudder-, elevator-, and warping controls, each of said servo-mechanisms being responsive to the indications of the corresponding gyrometer, the last one of said servo-mechanisms being connected to the adjustable devices for varying the power output of the lateral jet engines while the two other servo-mechanisms are respectively connected to said adjustable supplemental devices.

4. An aircraft, according to claim 1, further comprising a pair of direction spoilers mechanically interconnected and adapted to respectively project within the jet nozzle of the central jet engine along an axis perpendicular to the longitudinal plane of symmetry of the aircraft and a pair of pitching spoilers mechanically interconnected and adapted to respectively project within said jet nozzle along an axis perpendicular to said first axis and disposed in said plane of symmetry, and wherein the combined automatic and manual pilot unit comprises conventional rudder-, elevator-, and warping controls, three gyrometers subordinate to the aircraft speed and respectively responsive to variations around the yaw-, pitching- and rolling-axes, and three stabilizing servo-mechanisms respectively inserted in said rudder-, elevator-, and warping controls, each of said servo-mechanisms being responsive to the indications of the corresponding gyrometer, the last one of said servo-mechanisms being connected to the adjustable devices for varying the power output of the lateral jet engines while the two other servo-mechanisms are respectively connected to said pairs of direction and pitching spoilers, so that said spoilers act as supplemental adjustable devices for correcting the deviation of the jet of the central jet engine.

5. An aircraft, according to claim 1, wherein the adjustable devices for varying the power output of the lateral jet engines consist of the throttle-controls of said jet engines.

6. An aircraft, according to claim 1, wherein the adjustable devices for varying the direction of the jets of the lateral jet engines comprise tilting mounts respectively carrying said engines and hingedly mounted under the wing structure about horizontal pivotal axes perpendicular to the longitudinal plane of symmetry of the aircraft, and means for controlling the pivoting movement of said mounts about said axes in order to downwardly direct the jets of said lateral engines up to a vertical direction, and pivotable mounts being so designed that the lateral jet engines having their jets downwardly and vertically directed are located in front of the leading edge of the wing structure.

7. An aircraft, according to claim 6, wherein the means for controlling the pivoting movement of the mounts are adapted to maintain the lateral jet engines in positions wherein said engines act differentially.

References Cited in the file of this patent

UNITED STATES PATENTS

| | | |
|---|---|---|
| 1,720,939 | Wilkin | July 16, 1929 |
| 1,781,371 | Delo | Nov. 11, 1930 |
| 1,879,187 | Goddard | Sept. 27, 1932 |
| 2,135,033 | Courtney | Nov. 1, 1938 |
| 2,325,108 | Carlson | July 27, 1943 |
| 2,415,071 | Brie | Feb. 4, 1947 |
| 2,552,359 | Winslow | May 8, 1951 |
| 2,610,005 | Price | Sept. 9, 1952 |
| 2,630,986 | Gumbs | Mar. 10, 1953 |
| 2,729,406 | Bush | Jan. 3, 1956 |
| 2,762,584 | Price | Sept. 11, 1956 |
| 2,774,554 | Ashwood | Dec. 18, 1956 |
| 2,780,424 | Price | Feb. 5, 1957 |

FOREIGN PATENTS

| | | |
|---|---|---|
| 383,494 | Great Britain | Nov. 17, 1932 |
| 734,408 | Great Britain | Aug. 3, 1955 |
| 975,981 | France | Oct. 17, 1950 |

OTHER REFERENCES

Publication: Aviation Week, issue of Feb. 7, 1955, page 16.